April 5, 1932.  K. E. LYMAN ET AL  1,852,174
BRAKE OPERATING MEANS
Filed Dec. 27, 1926   3 Sheets-Sheet 1
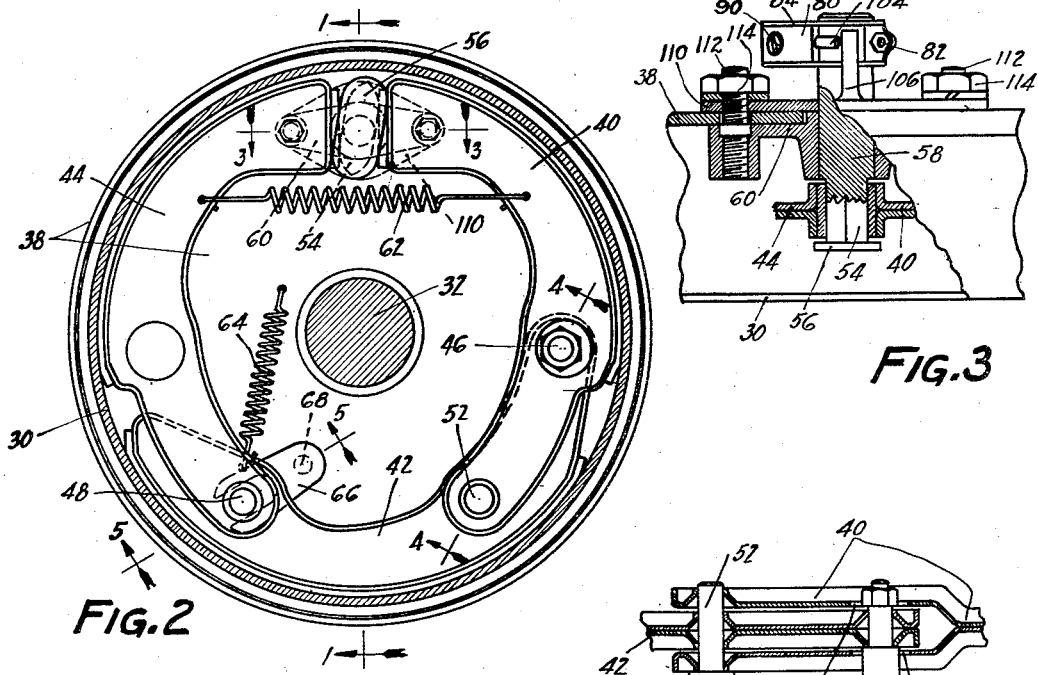
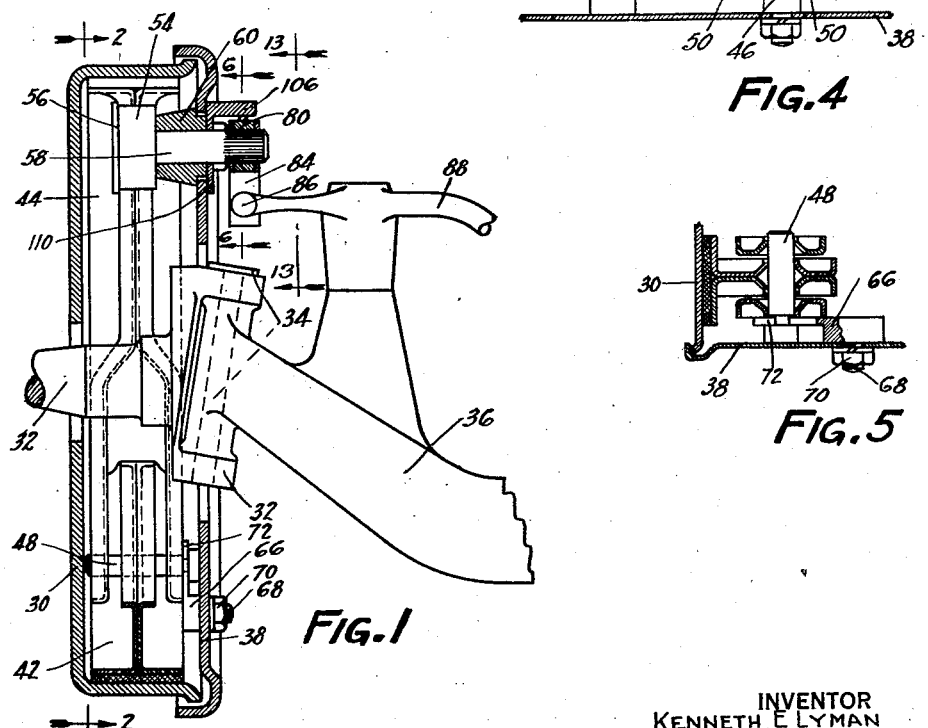
INVENTOR
KENNETH E LYMAN
MONTGOMERY W. McCONKEY
BY
M.W. McConkey
ATTORNEY April 5, 1932.  K. E. LYMAN ET AL  1,852,174
BRAKE OPERATING MEANS
Filed Dec. 27, 1926  3 Sheets-Sheet 2

INVENTOR
KENNETH E. LYMAN
MONTGOMERY W. McCONKEY
BY
*m. W. McConkey*
ATTORNEY

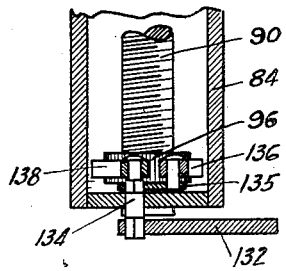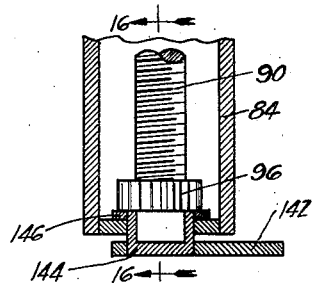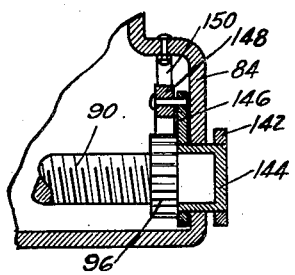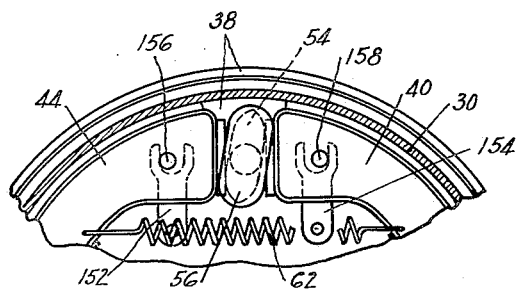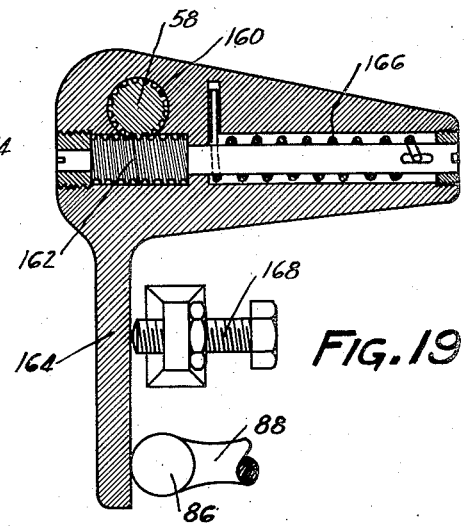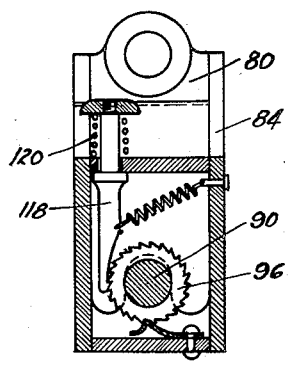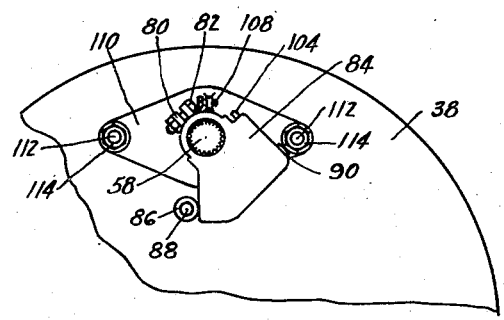

Patented Apr. 5, 1932

1,852,174

UNITED STATES PATENT OFFICE

KENNETH E. LYMAN AND MONTGOMERY W. McCONKEY, OF CHICAGO, ILLINOIS, ASSIGNORS TO BENDIX BRAKE COMPANY, OF SOUTH BEND, INDIANA, A CORPORATION OF ILLINOIS

BRAKE OPERATING MEANS

Application filed December 27, 1926. Serial No. 157,062.

This invention relates to brakes, and is illustrated as embodied in novel operating mechanism for an automobile brake.

An important object of the invention is to make the mechanism adjustable automatically to compensate for wear of the brake, and various of the more important features of novelty relate to the means for achieving this desired result. Among these features of novelty may be listed the arrangement of two parts of the mechanism to be adjusted (preferably during the application of the brake) automatically with respect to each other, the use of a fixed stop (which may, however, be adjustable if desired) to operate the adjusting means, the use of a thrust member which acts on a brake-applying arm and which is shiftable to compensate for the wear and which in one arrangement is a nut threaded on an adjusting worm, and novel pawl and ratchet means for operating the adjustment.

We also consider it desirable that the parts of the adjustment be inclosed in a substantially tight housing or casing, and we prefer to utilize this casing as one of the elements of the operating mechanism.

An important feature of the invention relates to utilizing an automatic adjustment to preserve, during the life of the brake, the positions with respect to the swivelling axis of a front wheel of the parts of the operating mechanism of a brake swivelling with the wheel. This avoids changes in the effect of the brake when the wheel is swivelled, which must otherwise be prevented by manual adjustment, caused by changes in the positions of the parts of the operating mechanism with respect to the swivelling axis.

The above and other objects and features of the invention, including various novel combinations of parts and desirable particular constructions, will be apparent from the following description of several illustrative embodiments shown in the accompanying drawings, in which:

Figure 1 is a vertical section centrally through the left front brake of an automobile, looking toward the front of the car; and taken on line 1—1 of Fig. 2.

Figure 2 is a vertical section through the brake on the line 2—2 of Figure 1, showing the brake shoes in side elevation;

Figure 3 is a partial section on the line 3—3 of Figure 2, showing part of the operating means;

Figure 4 is a partial section on the line 4—4 of Figure 2, showing the brake anchorage;

Figure 5 is a partial section on the line 5—5 of Figure 2, showing the connection between two of the brake shoes;

Figure 8:
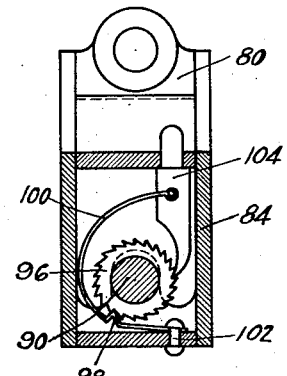
Figure 8 is a section through the operating mechanism, on the line 8—8 of Figure 6.
Figure 9:
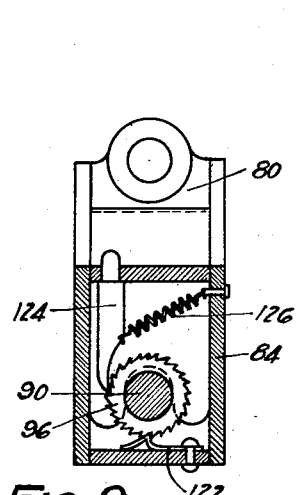
Figure 13:
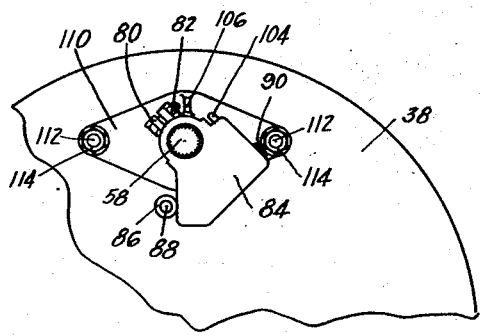

Figures 9, 10, 11, and 12 are views corresponding to Figure 8, but showing modifications of the pawl and ratchet;

Figure 13 is a section on the line 13—13 of Figure 1, showing the operating mechanism in elevation;

Figures 14, 15, and 16 are partial sections through the operating mechanism, showing modifications of the pawl and ratchet, Figure 16 being a section on the line 16—16 of Figure 15;

Figure 17 is a view corresponding to Figure 9, but showing an arrangement wherein the adjustment takes place when the brake is released instead of during its application;

Figure 18 is a view corresponding to the upper part of Figure 13, but showing an adjustment-operating stop which is adjustable;

Figure 19 is a vertical section, on a line corresponding to the line 6—6 of Figure 1, showing a different form of adjusting means; and Figure 20 is a view corresponding to the upper part of Figure 2, showing shoe-positioning means which may be used with the adjustment of Figure 19.

The brake selected for illustration is shown as including a drum 30 rotating with a wheel (not shown) mounted on a knuckle 32 swivelled, by a kingpin 34 or the like, at one end of a front axle 36. At the open side of drum 30 is arranged a non-rotatable support such as a backing plate 38, secured in any desired manner to the knuckle 32.

The brake proper includes three shoes 40, 42, and 44. Shoe 42 is anchored on a pivot 46 carried by the backing plate 38, and is operated by shoe 44, which is forked at its end to form spaced arms straddling the unanchored end of shoe 42 and connected thereto by a floating pivot 48. Shoe 40 is also forked at its end (Figure 4) to form spaced arms straddling the anchored end of shoe 42 and formed with relatively large openings 50 giving ample clearance for the anchor 46, and is anchored on a pivot 52 connecting it to shoe 42 near its anchored end.

The brake is applied by means such as a double cam 54 having an end flange 56 confining the ends of shoes 40 and 44 laterally, and shown as integral with a shaft 58 journalled in a support such as a bracket 60. Cam 54 forces shoes 40 and 44 apart, to apply the brake, against the resistance of a return spring 62, whereupon shoe 44 forces shoe 42 toward the drum against the resistance of the auxiliary return spring 64.

Shoe 42 is given a predetermined clearance, with respect to the drum, when the brake is released, by a stop 66 which has a stem or pivot 68 at its inner end projecting through the backing plate 38 and frictionally clamped thereto by a nut 70. Stop 66 is forked at its outer end to form arms straddling pin 48 and arranged in a groove 72 of the pin to hold the pin against endwise movement. These arms are spaced apart a little farther than the diameter of the grooved part of pin 48, by an excess amount determined by the clearance desired for shoe 42 when the brake is released.

When the brake is applied, if the lining has worn slightly, pin 48 engages the lower arm (Figure 2) of stop 66 and shifts the arm slightly angularly against the frictional resistance of nut 70. Now when the brake is released, the shoe 42 is swung away from the drum by spring 64 until the desired predetermined clearance is reached, whereupon pin 48 engages the upper arm of stop 66.

The novel stop 66 is not claimed herein, except in combination with other elements, as it is the invention of R. S. Sanford, and is covered by his application No. 85,962, filed February 4, 1926.

The present invention relates to adjusting the operating means of the brake, preferably automatically, to compensate for wear of the brake lining and other parts.

In combining the novel adjusting means with brake-applying mechanism of the general type illustrated, shaft 58 or its equivalent is operated by a device such as a crank arm 80, splined on the end of shaft 58, and having a split hub contracted about the shaft to clamp it in place by means of a clamp bolt 82. Arm 80 is operated by adjusting mechanism inclosed in a novel housing or casing 84, which also incloses the lower end of arm 80, and which has its sides sleeved (but not splined) on shaft 58 on opposite sides of arm 80. Casing 84 has a flat rear face, serving as a thrust surface engaged by an integral ball 86 on the end of a horizontal operating lever 88 fulcrumed between its ends on the axle 36. When the brake is applied, the center of ball 86 is in the axis of the king-pin 34 if no variation is desired when the wheel is swivelled in steering, or a few hundredths of an inch from that axis, on the side next the wheel, if it is desired to relieve the pressure on the brake when the wheel is swivelled to place it on the outside of a turn.

Figure 6:
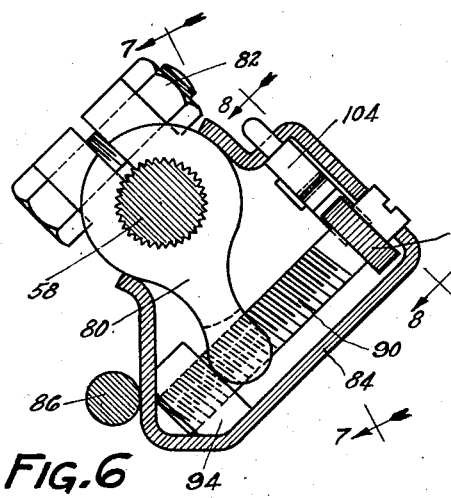
Figure 6 is a section through the operating mechanism, on the line 6—6 of Figure 1.
Figure 7:
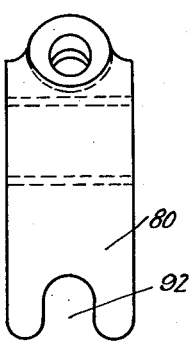
Figure 7 is an elevation of the brake-applying arm, looking in the direction of the arrows 7—7 in Figure 6.

In the arrangement of Figures 3, 6, and 13, the novel adjusting means includes a part such as a worm 90, extending crosswise with respect to arm 80 and through a notch 92 in the end of arm 80, and on which is threaded a square nut 94 which serves as a thrust member adjustably engaging arm 80 to apply the brake, and the sides of which are slidably embraced by the sides of casing 84 to prevent the nut from turning on the worm. The lower end of worm 90 is rotatably supported in a journal bearing integrally pressed from the material of the lower left-hand corner (Figure 6) of casing 84. The upper end of worm 90 is journalled in an opening formed in the side of casing 84, and projects through the casing, being shown as formed at its end with a slot for a screwdriver, to permit manual adjustment when desired.

Keyed on or integral with worm 90 is a ratchet wheel 96, the teeth of which may, if desired, be engaged by a holding tooth 98 formed on a leaf spring 100 secured to casing 84 at 102 (Figure 8), tooth 98 holding the worm 90 against turning except during adjustments. Tooth 98 is preferably formed so that the ratchet can be forced back past it in resetting the device to its initial position, or it may be omitted entirely and the friction of the parts relied on to hold the ratchet.

Ratchet wheel 96 is turned, to shift nut 94 to make the adjustment, by a pawl or plunger 104, extending through the casing and operated against the resistance of spring 100 by engagement with a fixed stop 106. As shown in Figure 18, the stop may be made adjustable by using a setscrew 108 or the like.

Stop 106 is integral with (Figure 13), or carried by (Figure 18), a plate 110 mounted on bolts 112 passing through somewhat larger openings in backing plate 38 and threaded as studs into the bracket 60 which carries the cam 54 and its shaft 58. Nuts 114 threaded on bolts or studs 112 clamp the bracket 60 and plate 110 lightly and frictionally against the backing plate, so that while normally they are stationary they can shift if necessary when the brake is applied, to permit cam 54 to center itself between shoes 40 and 44. It will be seen that when such shifting takes place, the adjusting means shifts with the cam, and stop 106 or 108 shifts with the adjusting means.

In operation, if the brake has worn, when a heavy application takes place, lever 88 forces casing 84 in a counter-clockwise direction (Figures 6 and 13), nut 94 acting on arm 80 to turn shaft 58 to apply the brake, and toward the end of the brake-applying movement the pawl or plunger 104 engages stop 106 or 108 to turn ratchet wheel 96 one tooth, thus shifting nut 94 up the worm 90 by a distance equal to a fraction of the pitch of the worm, the fraction being one over the number of teeth in the ratchet wheel 96. Thus a small adjustment takes place on each heavy brake-application until the wear is completely adjusted for. As lever 88 always returns to the same idle position when the brake is released, cam 54 gradually turns as the adjustment takes place, to preserve a predetermined clearance for shoes 40 and 44 in released position.

Since casing 84 is substantially tight, it may be filled with oil or other lubricant, which will submerge the entire adjusting mechanism. A suitable fitting may if desired be provided for filling the casing with lubricant from time to time.

If it is desired to make the adjustment when the brake is released, instead of when it is applied, the arrangement of Figure 17 may be used. In this arrangement the teeth of ratchet 96 are reversed, and pawl 118 (corresponding to pawl 104) is formed as a hook engaging one of the teeth on its reverse movement. Pawl 118 is engaged by stop 106 or 108, as before, and is depressed against the resistance of a relatively stiff return spring 120, engaging the next tooth of ratchet 96 if adjustment is necessary. Now, when the brake is released, the spring 120 will operate pawl 118 to turn ratchet 96 to make the adjustment.

Figure 10:
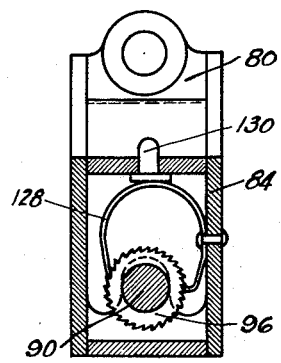

In the arrangement of Figure 9, there is a separate spring 122 to hold ratchet 96, and the pawl or plunger 124 is urged toward released position and also against ratchet 96 by an inclined tension coil spring 126. In Figure 10, the ratchet is held by one end of a spring 128, the other end of which forms a pawl operated by a separate plunger 130 to make the adjustment.

Figure 11:
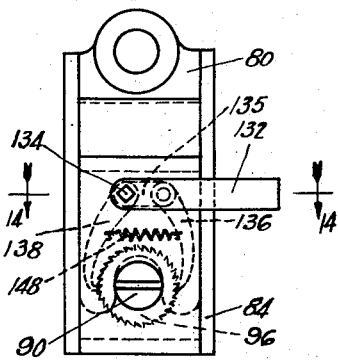

In Figures 11 and 14, a lever 132 extends along the side of casing 84 to engage stop 106 or 108, and is mounted on a pivot 134. Lever 132 carries an arm 135, on which is mounted a pawl 136 to make the adjustment, while a holding pawl 138 is mounted on the pivot 134. Pawls 136 and 138 are connected by a tension spring 140, which urges both of them against ratchet 96.

Figure 12:
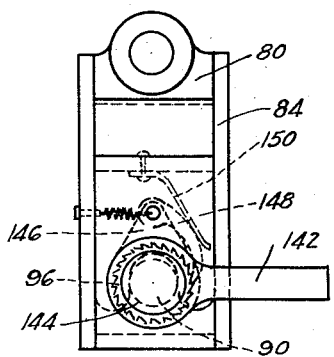

In Figures 12, 15, and 16, a lever 142, engageable with the stop 106 or 108, is secured to a cap 144, which forms a journal bearing for the end of worm 90, and which carries within the casing an arm 146 carrying an operating pawl 148 pressed against ratchet 96 by a leaf spring 150.

In the arrangement of Figures 19 and 20, the predetermined clearance of shoes 40 and 44 is insured by two forked stops 152 and 154, embracing pins 156 and 158 carried by the shoes, and operating the same as stop 66. Shaft 58 is formed with worm gear teeth 160, meshing with a worm 162 carried by a crank arm 164 engaged by lever 88. When the brake is released, whatever the positions of shoes 40 and 44, cam 54 is held in engagement with them by a torsion spring 166 which tends to turn shaft 58 in the direction to apply the brake. Spring 166 is not strong enough to overcome spring 62, so if adjustment should be necessary, spring 166 turns worm 162 to turn arm 164 on the shaft until it engages a fixed and preferably adjustable stop 168, shown as a setscrew carried by the plate 110. Arm 164 is formed as a substantially closed housing for worm 162 and spring 166.

As an important advantage of the invention, the position of the center of ball 86 with respect to the swivelling axis of the wheel (i. e. the axis of king-pin 34), when the brake is applied with a given force, remains constant throughout the life of the brake, regardless of the wear of the brake lining. Since the position of the center of ball 86 with respect to the swivelling axis determines the effect on the brake of swivelling the wheel, this preserves uniformity of this effect without special attention.

While several illustrative embodiments have been described in detail, it is not our intention to limit the scope of the invention to those particular embodiments, or otherwise than by the terms of the appended claims.

We claim:

1. Brake-operating mechanism comprising, in combination, a housing forming a substantially closed casing and also serving as an actuating device, a shaft projecting into the housing, and means inclosed within the housing for connecting the housing to the shaft and arranged to be automatically operated to adjust the position of the housing with respect to the shaft to compensate for wear of the brake.

2. Brake-operating mechanism comprising, in combination, a housing forming a substantially closed casing and also serving as an actuating device, a stop adjacent the housing, a shaft projecting into the housing, and means in the housing for connecting the housing to the shaft and arranged to be automatically operated by the stop to adjust the position of the housing with respect to the shaft to compensate for wear of the brake.

3. Brake-operating mechanism comprising, in combination, a brake-applying part, an operating part therefor, and means through which the operating part acts on the brake-applying part and which includes a worm-and-gear device mounted on the operating part and automatically operated to shift the operating part with respect to the brake-applying part to compensate for wear of the brake.

4. Brake-operating mechanism comprising, in combination, a brake-applying shaft, an operating member therefor, and means through which said member acts on the shaft and which includes a worm-and-gear device movable with the member and automatically operated to shift the operating part with respect to the brake-applying part to compensate for wear of the brake.

5. Brake-operating mechanism comprising, in combination, a brake-applying part, an operating part therefor, and means through which the operating part acts on the brake-applying part and which includes a device carried by the operating part and automatically shifted to change the angular position of said member with respect to the shaft to compensate for wear of the brake.

6. Brake-operating mechanism comprising, in combination, two parts one of which operates the other to apply the brake, a thrust member through which the one part operates the other and which is shiftable to compensate for wear of the brake, a pawl mounted on the thrust member for shifting said member, and a stop arranged to operate the pawl.

7. Brake-operating mechanism comprising, in combination, two parts one of which operates the other to apply the brake, a thrust member through which the one part operates the other and which is shiftable to compensate for wear of the brake, a worm having a ratchet wheel and arranged to shift the thrust member when turned, a pawl engageable with the ratchet wheel to turn the worm, and a stop arranged to operate the pawl.

8. Brake-operating mechanism comprising, in combination, two parts one of which operates the other to apply the brake, a thrust member through which the one part operates the other and which is shiftable to compensate for wear of the brake, a worm having a ratchet wheel and arranged to shift the thrust member when turned, a pawl engageable with the ratchet wheel to turn the worm when the brake is released, a stop arranged to set the pawl, and a spring arranged to return the pawl to idle position and to turn the ratchet wheel during return movement of the pawl.

9. Brake-operating mechanism comprising, in combination, a brake-applying arm, a casing inclosing the arm, a worm carried by the casing and extending crosswise of said arm, a nut threaded on the worm and held against rotation and arranged to thrust against the arm, a ratchet wheel on the worm, and a plunger extending outside the casing and having a pawl inside the casing arranged to turn the ratchet wheel.

10. Brake-operating mechanism comprising, in combination, a brake-applying arm, operating means for the arm including a worm extending crosswise of said arm, a nut threaded on the worm and held against rotation and arranged to thrust against the arm, a ratchet wheel on the worm, and a pawl arranged to turn the ratchet wheel.

11. Brake-operating mechanism comprising, in combination, a brake-applying arm, operating means for the arm including a worm extending crosswise of said arm, a nut threaded on the worm and held against rotation and arranged to thrust against the arm, a ratchet wheel on the worm, and a pawl arranged to turn the ratchet wheel, together with a stationary stop engaged by the pawl to operate it.

12. Brake-operating mechanism comprising, in combination, a shaft having a worm thread, an operating arm on the shaft, a worm carried by the arm and meshing with said thread, and a spring for turning the worm to adjust the arm automatically with respect to the shaft.

13. Brake-operating mechanism comprising, in combination, a bracket mounted to shift automatically to center itself with respect to the brake, brake-applying means mounted on and shiftable with the bracket and automatically adjustable to compensate for wear of the brake, and a stop arranged to adjust said means and which is also mounted on and shiftable with said bracket.

14. A device for automatically adjusting a brake and comprising, in combination, a casing arranged to be mounted on a shaft at its upper end and having its lower end substantially closed, a worm in the lower part of the casing and extending crosswise thereof with respect to a shaft on which the casing is mounted, a thrust nut threaded on the worm and held by the casing against rotation, and means extending outside the casing and arranged to turn the worm to adjust the thrust nut longitudinally of the worm.

15. A device for automatically adjusting a brake and comprising, in combination, a casing arranged to be mounted on a shaft at its upper end and having its lower end substantially closed, a worm in the lower part of the casing and extending crosswise thereof with respect to a shaft on which the casing is mounted, a thrust nut threaded on the worm and held against rotation, and means arranged to turn the worm to adjust the thrust nut longitudinally of the worm including a plunger extending outside the casing.

16. Brake-operating mechanism comprising, in combination, an applying device, a shiftable support for said device arranged to shift to center the applying device, adjusting means for the applying device carried by and shifting with the support, and a stop for operating said adjusting means and which is also carried by and shifting with said support.

17. Brake-operating mechanism comprising, in combination, an applying device, a shiftable support for said device arranged to shift to center the applying device, adjusting means for the applying device carried by and shifting with the support, and a stop for operating said adjusting means and which is also carried by and shifting with said support, the stop being adjustable with respect to the support.

18. Brake mechanism comprising, in combination with a rotatable brake operating shaft, an arm carried by the shaft and angularly adjustable thereover, an operating member engaging said arm to rotate the shaft and a spring urged part carried by said arm and operable to vary the angular adjustment of the arm upon the shaft.

In testimony whereof, we have hereunto signed our names.

KENNETH E. LYMAN.
MONTGOMERY W. McCONKEY.